United States Patent
Attanasio et al.

(10) Patent No.: US 8,645,672 B2
(45) Date of Patent: Feb. 4, 2014

(54) CONFIGURING A COMPUTER SYSTEM FOR A SOFTWARE PACKAGE INSTALLATION

(75) Inventors: Luisa Attanasio, Moliterno (IT); Domenico D'Alterio, Rome (IT); Gianluca Gigliarelli, Rome (IT); Francesco Lecciso, Rome (IT); Gianluca Mariani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 13/163,072

(22) Filed: Jun. 17, 2011

(65) Prior Publication Data

US 2012/0005465 A1 Jan. 5, 2012

(30) Foreign Application Priority Data

Jul. 2, 2010 (EP) .................................. 10168326

(51) Int. Cl.
*G06F 15/177* (2006.01)

(52) U.S. Cl.
USPC ................................ 713/1; 713/100; 717/172

(58) Field of Classification Search
None
See application file for complete search history.

(56) References Cited

U.S. PATENT DOCUMENTS

| | | | |
|---|---|---|---|
| 6,220,768 B1 * | 4/2001 | Barroux | 709/224 |
| 6,865,737 B1 | 3/2005 | Lucas et al. | |
| 7,000,222 B1 * | 2/2006 | Curtis et al. | 717/118 |
| 2004/0148336 A1 | 7/2004 | Hubbard et al. | |
| 2005/0223374 A1 * | 10/2005 | Wishart et al. | 717/173 |
| 2009/0037934 A1 | 2/2009 | Sullivan | |

FOREIGN PATENT DOCUMENTS

EP 1868086 A1 12/2007

OTHER PUBLICATIONS

Marc Dieben, Authorized Officer for the European Patent Office, International Search Report and Written Opinion for Application No. PCT/EP2011/060827, Rijswijk, The Netherlands.

* cited by examiner

*Primary Examiner* — Dennis M Butler
(74) *Attorney, Agent, or Firm* — Lee Law, PLLC; Christopher B. Lee

(57) ABSTRACT

A request from an installer of a software application to configure the computer system for installation of the software application is received at a configuration client. Upon receiving the request, a message is sent to a local agent of the computer system to request a configuration for the installation of the software application. The message includes an identifier of the software application used by a configuration management server to identify the configuration corresponding to the software application. A configuration element is received from the local agent in response to the message. The configuration element includes a variable for holding a value that represents a characteristic of the computer system. The value of the variable is configured as a function of the computer system. The configuration element, including the configured variable value, is provided to the installer of the software application and is used for the installation of the software application.

24 Claims, 3 Drawing Sheets

CONFIGURING A COMPUTER SYSTEM FOR A SOFTWARE PACKAGE INSTALLATION

RELATED APPLICATIONS

This application claims priority to and claims the benefit of European Patent Application Serial No. EP10168326.6 titled "SYSTEM AND METHOD FOR CONFIGURING A COMPUTER SYSTEM FOR A SOFTWARE PACKAGE INSTALLATION," which was filed in the European Patent Office on Jul. 2, 2010, and which is incorporated herein by reference in its entirety.

BACKGROUND

The present invention relates to a method and system for configuring a computer system for the installation of a software application package.

Administrators of information technology (IT) environments must manage an ever-increasing number of computing devices. They must often install software applications on the computing devices they manage to apply the latest security patches or to deploy a mandatory application. The great numbers and the diversity of the computing devices to manage make it very difficult to deploy the installation of all the computing devices in a consistent manner. Furthermore, different installation methods must be supported by automated installation processes as users are more and more reluctant to perform such installations themselves.

BRIEF SUMMARY

A method for configuring a computer system includes receiving, at a configuration client, a request from an installer of a software application to configure the computer system for installation of the software application; in response to receiving the request, sending a message to a local agent of the computer system to request a configuration for the installation of the software application, the message comprising an identifier of the software application used by a configuration management server to identify the configuration corresponding to the software application; receiving a configuration element from the local agent in response to the message, the configuration element comprising a variable for holding a value that represents a characteristic of the computer system; configuring the value of the variable as a function of the computer system; and providing the configuration element comprising the configured variable value to the installer of the software application, where the configuration element is used for the installation of the software application.

An apparatus for configuring a computer system includes a communication interface and a processor programmed to receive, at a configuration client via the communication interface, a request from an installer of a software application to configure the computer system for installation of the software application; in response to receiving the request, send a message via the communication interface to a local agent of the computer system to request a configuration for the installation of the software application, the message comprising an identifier of the software application used by a configuration management server to identify the configuration corresponding to the software application; receive a configuration element from the local agent in response to the message, the configuration element comprising a variable for holding a value that represents a characteristic of the computer system; configure the value of the variable as a function of the computer system; and provide the configuration element comprising the configured variable value to the installer of the software application, where the configuration element is used for the installation of the software application.

A computer program product includes a computer readable storage medium including computer readable program code, where the computer readable program code when executed on a computer causes the computer to receive, at a configuration client, a request from an installer of a software application to configure the computer system for installation of the software application; in response to receiving the request, send a message to a local agent of the computer system to request a configuration for the installation of the software application, the message comprising an identifier of the software application used by a configuration management server to identify the configuration corresponding to the software application; receive a configuration element from the local agent in response to the message, the configuration element comprising a variable for holding a value that represents a characteristic of the computer system; configure the value of the variable as a function of the computer system; and provide the configuration element comprising the configured variable value to the installer of the software application, where the configuration element is used for the installation of the software application.

BRIEF DESCRIPTION OF THE SEVERAL VIEWS OF THE DRAWINGS

The present subject matter will now be described by way of example with reference to the accompanying drawings in which like references denote similar elements, and in which.

DETAILED DESCRIPTION

Figure 1:
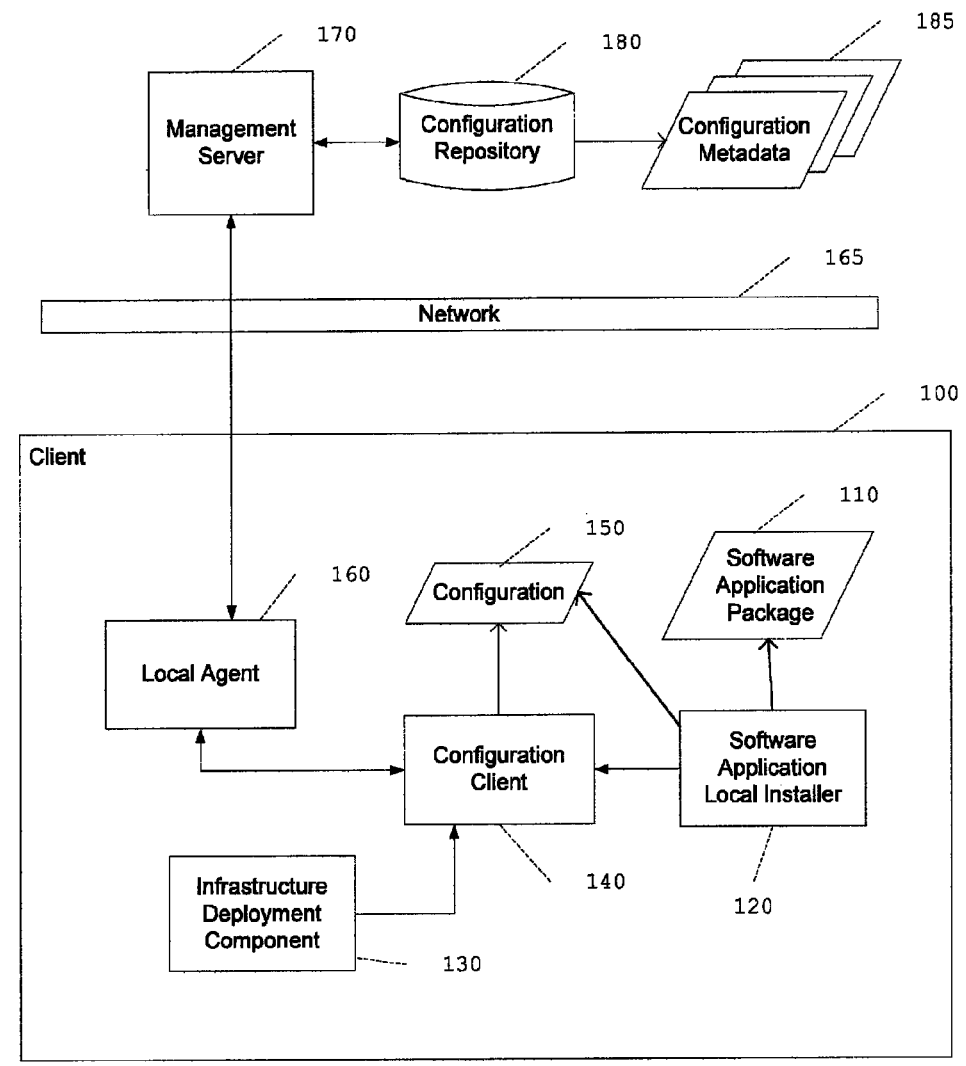
FIG. 1 is a high level component block diagram an example of an implementation of a system for configuring a computer system for a software package installation according to an embodiment of the present subject matter.

FIG. 1 is a high level component block diagram an example of an implementation of a system for configuring a computer system for a software package installation. FIG. 1 shows a client device (100) on which a software application package (110) will be installed by a software application installer (120) or by an infrastructure deployment component (130), a configuration client (140), a configuration (150) package, a local agent (160) for retrieving configuration (150) from a remote management server (170) via a network (165), and a configuration repository (180) that holds configuration metadata (185).

The local agent (160) retrieves the configuration (150) from the management server (170). The management server (170) may be accessed either locally or through the network (165). The software application to be installed is grouped so as to form a software application package (110) or archive. The software application may be compressed in this archive or package or may be left uncompressed. The software application may also be encrypted to increase the security of the installation process.

The software application package (110) includes all or most of the binaries, libraries and/or components that are required for the software application, and may be installed on the client device (100). The installation of the software application includes copying the required components or libraries to a particular location so that they may be later accessed by the computer system and executed. The installation of the software application very often also includes configuring some components of the software application that depend on the technical or business environment in which the client device (100) operates, the particular configuration of the client device (100) itself, the account that is used to install the software application, the user that would use the software application, or other information provided by the user which corresponds to user preferences. The user preferences may be defined during the installation or may be preconfigured by the user and stored in the configuration repository (180). The configuration of the software application on the client device (100) thus involves modifying some files included in the software application package (110) and/or creating new files that may then be copied onto the client device (100) and used by an installer of the software application package (110) or by the software application itself during execution. The file is modified or created by the configuration, and may be in text or binary format. The files may have any structure, such as XML, as long as the files may be recognized by the software component using them.

The configuration (150) may hold various data, such as an Internet protocol (IP) address or host name of the client device (100) or of another computer system that may be used during the execution or the installation of the software application, a location (e.g., in the form of a uniform resource locator (URL)) where the software application package may be temporary stored for the installation, and/or a location where the software application may be stored for execution. The location(s) corresponding to the storage space may be either local or remote.

The configuration (150) may also include a set of preconfigured data, for example stored centrally in the configuration repository (180) in the form of configuration metadata (185). Such preconfigured data may include a policy for using the software application, a counter of the number of instances of software application that are installed on the same network (165), technical requirements that the client device (100) must match so that the software application may execute successfully on the client device (100), minimum rights that a user must have to be able to use the software application, etc.

The configuration (150) may also hold data such as a location from which the software application package (110) may be retrieved, installation specific information such as the number of retries authorized for an installation, maximum duration for the installation, and lists of software components that are prerequisites for the installation and/or for the execution of the software application.

The configuration may further include scripts or other software complements to automatically discover characteristics of the client device (100) or computer system on which the installation will be performed. The characteristics to be discovered may be a pre-existing configuration of a preinstalled version of the software application. The configuration metadata (185) may take various forms such as extensible markup language (XML), or a table in a database, flat files, etc., and may be imported into the system during the registration of the software application to the management server (170).

The installation of the software application may be performed by a local installer or by an infrastructure deployment component (130), a specialized component enabled to retrieve the software application package (110) from a remote location automatically in response to messages sent from a remote server, such as the management server (170) in FIG. 1.

The software application may also be installed by a remote push installation performed by a system administrator using a management interface, or on demand where the local agent (160) downloads the software application and installs it at runtime. The local agent (160) may have a very small footprint and may provide a small set of basic functionality. The local agent (160) may not provide any specialized system management function, but may instead operate as a bootstrap component with the behavior of a hosting environment for the other components of the architecture.

This large variety of possible installation methods provides an ability to configure the software application in an easy and consistent way. Such configuration may take into account the fact that a user may not always be available to answer specific details of the configuration during installation. This is particularly the case for an installation on demand or during a silent installation. This is important to isolate the configuration of the software application from the actual deployment of the software application.

The configuration client (140) may be accessible from the infrastructure deployment component (130) as well as the software application local installer (120) using the same application programming interfaces (APIs) to perform the configuration. The configuration of installation of the software application may be managed by the configuration client (140). The infrastructure deployment component (130) as well as the software application local installer (120) are able to pass messages to further customize the configuration.

Figure 2:
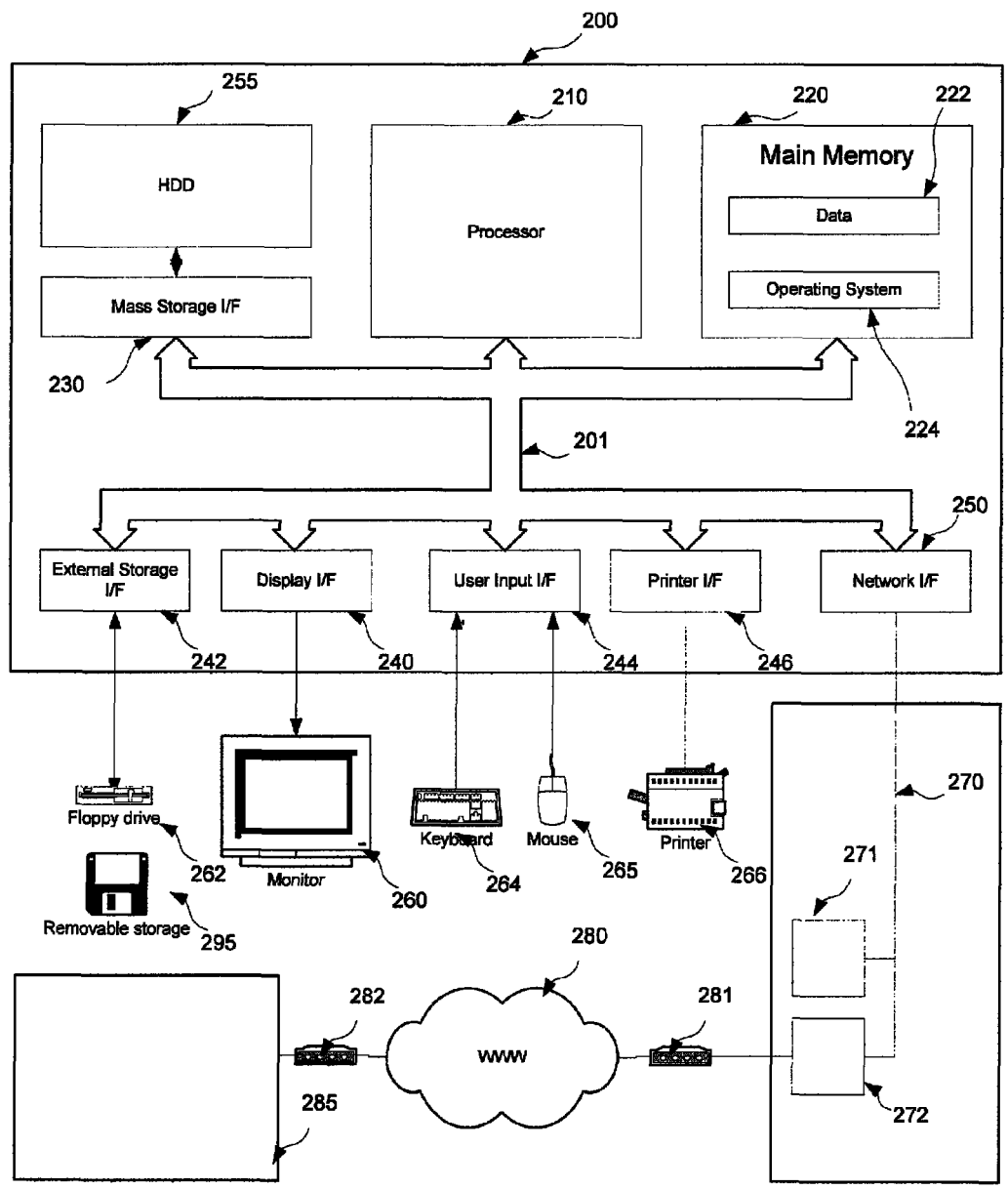
FIG. 2 is a block diagram of an example of an implementation of a computer system according to an embodiment of the present subject matter.

FIG. 2 is a block diagram of an example of an implementation of a computer system (200) including a processor 210, a main memory 220, a mass storage interface 230, a display interface 240, and a network communication interface 250. These system components are interconnected through the use of a system bus 201. Mass storage interface 230 is used to connect mass storage devices, such as a hard disk drive (HDD) 255, to the computer system 200. One specific type of removable storage interface drive 262 is a floppy disk drive that may store data to and read data from a Floppy disk 295, but may other types of computer readable storage media may be used, such as a readable and optionally writable CD ROM drive. There is similarly provided a user input interface 244 that receives user interactions from interface devices, such as a mouse 265 and a keyboard 264. There is still further provided a printer interface 246 that may send and optionally receive signals to and from a printer 266.

Main memory 220 in accordance with the certain implementations includes data 222, and an operating system 224. Computer system 200 may utilize virtual addressing mechanisms that allow the programs of computer system 200 to behave as if they only have access to a large, single storage entity instead of access to multiple, smaller storage entities such as main memory 220 and HDD 255. Therefore, while data 222 and operating system 224 are shown stored in the main memory 220, they may or may not be stored in main memory 220 at the same time. It should also be noted that the term "memory" is used herein to generically refer to the entire virtual memory of computer system 200.

Data 222 represents any data that serves as input to and/or output from any program in computer system 200. Operating system 224 may include a multitasking operating system, such as OS/400®. However, those skilled in the art will appreciate that the spirit and scope of the present invention is not limited to any one operating system.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, display interface 240, network interface 250, and system bus 201.

Although computer system 200 is shown to contain only a single processor and a single system bus, multiple processors and/or multiple buses may be used. In addition, the interfaces used in certain embodiments each include separate, fully programmed microprocessors that are used to off-load compute-intensive processing from processor 210. However, the present subject matter applies equally to computer systems that use I/O adapters to perform similar functions.

Display interface 240 is used to directly connect one or more displays 260 to computer system 200. These displays 260, which may be non-intelligent (e.g., dumb) terminals or fully programmable workstations, are used to allow system administrators and users to communicate with computer system 200. Note, however, that while display interface 240 is provided to support communication with one or more displays 260, computer system 200 does not necessarily require a display 265, because all needed interaction with users and other processes may occur via network interface 250.

Network interface 250 is used to connect other computer systems and/or workstations (e.g., 271 in FIG. 2) to computer system 200 across a network 270. The present subject matter applies equally no matter how computer system 200 may be connected to other computer systems and/or workstations, regardless of whether the network connection 270 is made using present-day analogue and/or digital techniques or via some networking mechanism of the future. In addition, many different network protocols may be used to implement a network. These protocols may include specialized computer programs that allow computers to communicate across network 270. Transmission control protocol/Internet protocol (TCP/IP) is an example of a suitable network protocol, for example over an Ethernet network. As shown, the network 270 connects the computer system 200 to two further devices 271 and 272, which may be other computer systems similar to that described above, or other network capable devices such as printers, routers etc. In the present example, network device 272 is a local server, which is connected via a modem 281 to a public network 280 such as the word wide web. By means of this public network 280 a connection to a remote device or system 285 may be established.

At this point, it should be noted that, while the present subject matter has been and will continue to be described in the context of a fully functional computer system, the present subject matter is capable of being distributed as a program product in a variety of forms, and that the present subject matter applies equally regardless of the particular type of interconnection used to actually carry out the distribution. Examples of suitable interconnection include: recordable type media such as floppy disks and CD ROM (e.g., 295 of FIG. 2), and transmission type media such as digital and analog communications links.

Figure 3:
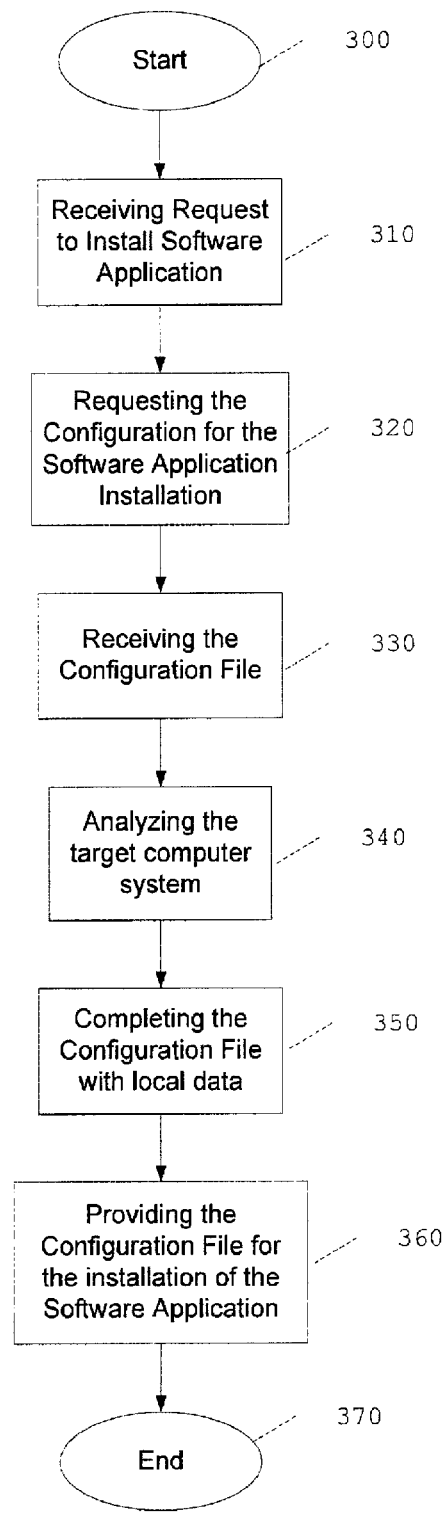
FIG. 3 is a flow chart of an example of an implementation of a high level activity diagram according to an embodiment of the present subject matter.

FIG. 3 is a flow chart of an example of an implementation of a high level activity diagram including steps that may be executed to implement the present subject matter, including the following steps a start state (300), a step of receiving a request to install a software application (310), a step of requesting a configuration for the software application installation (320), a step of receiving the configuration file (330), a step of analyzing the target computer system (340), a step of completing the configuration file with local data (350), a step of providing the configuration file for installation of the software application (360), and an end state (370).

Referring again to FIG. 1, the configuration client (140) receives the request to obtain the configuration (150) of a software application package (110) by the software application local installer (120) or the infrastructure deployment component (130). The configuration client (140) then sends a message to the local agent (160) to request the configuration (150) for the installation of said software application. The message includes an identifier of the software application to be installed. The local agent (160) forwards the request to the management server (170). It may augment the message with information specific to the client device (100) such as its host name, its number of central processing units (CPUs), etc. The management server (170) processes the request and retrieves from the configuration repository (180) the corresponding configuration metadata (185) including information required to configure the installation of the software application. The configuration client (140) receives (330) the configuration (150) from the management server (170) through the local agent (160). The configuration (150) may take the form of one or several files, in text or binary form. The configuration (150) may also be an extensible markup language (XML) file, optionally associated to other files for validating its structure (such as an extensible stylesheet language (XSL) or a document type definition or declaration (DTD) file), or any text file structure or unstructured.

The configuration client (140) analyzes the configuration (150) to identify at least one variable that needs to be set using local data on the target computer system. The local agent (160) analyzes (340) the client device (100) and completes (350) the configuration (150) file with the local data either discovered on the target system using scripts for example or received from the user during installation of the software application. User inputs may be provided through a user interface during installation or, prior to the installation, as user preferences in the configuration repository (180). Once the configuration is completed, the configuration client (140) provides (360) the configuration (150) for installation of the software application to the software application local installer (120) or to the infrastructure deployment component (130). To that end it may write a configuration (150) file to a predefined location, or send a message to the installing program (e.g., the application local installer 120 or the infrastructure deployment component 130).

For discovering the characteristic of the computer system to complete the configuration file, the local agent (160) may look for a predefined set of characteristics such as the client device (100) hostname or Internet protocol (IP) address, the remaining storage left on the hard disc, etc., or it may execute a script providing information received from the management server (170). The script may also be included in the configuration metadata (185) and then in the configuration file (150) so that it may be used by the configuration client (140).

Another example may include a method and system for configuring a computer system for the installation of a software application by a local or remote installer and performing full configuration by integrating data from the local system and from any remote configuration repository.

An advantage of the present subject matter is that a large number of software application installations may be managed centrally and deployed on remote devices taking into account the local configuration of the device. A further advantage is that the configuration method may leverage configuration data that may only be resolved locally at installation time, and may not be pre-configured and stored in a central server.

A variable may be used to hold a uniform resource locator (URL) of a folder for storing temporarily data required for the installation of the software application. An advantage is that a temporary location for storing the installation package may be determined at installation time and it is not necessary to pre-configure this information at the central server level for all the possible variations of such value.

Additionally, a step of discovering a characteristic of the computer system by the local agent, and, at the step of configuring, the value of the variable may be set to the value of the characteristic by the local agent after the discovery step. An advantage is that the configuration data may take into account specific computer environments that may not be anticipated when the software application is prepared for deployment.

Further, the characteristic discovered by the local agent may include the host name or the Internet protocol (IP) address of the computer system. An advantage is that such information may be used for statistics or compliance reasons, such as to count the number of active instances of a particular software application and to identify the systems on which they are installed.

As a further example, the configuration element may include data retrieved from a remote configuration repository. An advantage is that a part of the configuration data may be set centrally thus minimizing the need for user input at the installation time.

Additionally, the configuration element may further include a second variable for holding a value dependent on the software application. An advantage is that parameters specific to the software application being installed may be taken into account.

As yet another example, the value of the second variable may depend on the computer system and the software application. An advantage is that the configuration data may be further refined to take into account specific cases in a system managed centrally.

Further, the second variable may hold a uniform resource locator (URL) of a folder where the software application is to be installed. An advantage is that user preferences, perhaps defined centrally, may be taken into account.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for configuring a computer system, comprising:
    receiving, at a configuration client, a request from an installer of a software application to configure the computer system for installation of the software application;
    in response to receiving the request, sending a message to a local agent of the computer system to request a configuration for the installation of the software application, the message comprising an identifier of the software application used by a configuration management server to identify the configuration corresponding to the software application;
    receiving a configuration element from the local agent in response to the message, the configuration element comprising a variable for holding a value that represents a characteristic of the computer system;
    configuring the value of the variable as a function of the computer system; and
    providing the configuration element comprising the configured variable value to the installer of the software application, where the configuration element is used for the installation of the software application.

2. The method of claim 1, where the variable further holds a uniform resource locator (URL) of a folder for temporarily storing data for the installation of the software application.

3. The method of claim 1, where, configuring the value of the variable as the function of the computer system comprises discovering, via the local agent, the characteristic of the computer system and setting, in response to the discovery, the value of the variable to the characteristic.

4. The method of claim 3, where discovering, via the local agent, the characteristic of the computer system comprises discovering the characteristic as one of a host name and an Internet protocol (IP) address of the computer system.

5. The method of claim 1, where the configuration element comprises data retrieved from a remote configuration repository.

6. The method of claim 1, where the configuration element comprises a second variable for holding a value dependent on the software application.

7. The method of claim 6, where the value of the second variable depends upon the computer system and the software application.

8. The method of claim 6, where the second variable holds a uniform resource locator (URL) of a folder where the software application is to be installed.

9. An apparatus for configuring a computer system, comprising:
    a communication interface; and
    a processor programmed to:
        receive, at a configuration client via the communication interface, a request from an installer of a software application to configure the computer system for installation of the software application;
        in response to receiving the request, send a message via the communication interface to a local agent of the computer system to request a configuration for the installation of the software application, the message comprising an identifier of the software application used by a configuration management server to identify the configuration corresponding to the software application;

receive a configuration element from the local agent in response to the message, the configuration element comprising a variable for holding a value that represents a characteristic of the computer system;

configure the value of the variable as a function of the computer system; and provide the configuration element comprising the configured variable value to the installer of the software application, where the configuration element is used for the installation of the software application.

10. The apparatus of claim 9, where the variable further holds a uniform resource locator (URL) of a folder for temporarily storing data for the installation of the software application.

11. The apparatus of claim 9, where, in being programmed to configure the value of the variable as the function of the computer system, the processor is programmed to discover, via the local agent, the characteristic of the computer system and set, in response to the discovery, the value of the variable to the characteristic.

12. The apparatus of claim 11, where, in being programmed to discover, via the local agent, the characteristic of the computer system, the processor is programmed to discover the characteristic as one of a host name and an Internet protocol (IP) address of the computer system.

13. The apparatus of claim 9, where the configuration element comprises data retrieved from a remote configuration repository.

14. The apparatus of claim 9, where the configuration element comprises a second variable for holding a value dependent on the software application.

15. The apparatus of claim 14, where the value of the second variable depends upon the computer system and the software application.

16. The apparatus of claim 14, where the second variable holds a uniform resource locator (URL) of a folder where the software application is to be installed.

17. A computer program product comprising a computer readable storage medium including computer readable program code, where the computer readable program code when executed on a computer causes the computer to:

receive, at a configuration client, a request from an installer of a software application to configure the computer system for installation of the software application;

in response to receiving the request, send a message to a local agent of the computer system to request a configuration for the installation of the software application, the message comprising an identifier of the software application used by a configuration management server to identify the configuration corresponding to the software application;

receive a configuration element from the local agent in response to the message, the configuration element comprising a variable for holding a value that represents a characteristic of the computer system;

configure the value of the variable as a function of the computer system; and provide the configuration element comprising the configured variable value to the installer of the software application, where the configuration element is used for the installation of the software application.

18. The computer program product of claim 17, where the variable further holds a uniform resource locator (URL) of a folder for temporarily storing data for the installation of the software application.

19. The computer program product of claim 17, where, in causing the computer to configure the value of the variable as the function of the computer system, the computer readable program code when executed on the computer causes the computer to discover, via the local agent, the characteristic of the computer system and set, in response to the discovery, the value of the variable to the characteristic.

20. The computer program product of claim 19, where, in causing the computer to discover, via the local agent, the characteristic of the computer system, the computer readable program code when executed on the computer causes the computer to discover the characteristic as one of a host name and an Internet protocol (IP) address of the computer system.

21. The computer program product of claim 17, where the configuration element comprises data retrieved from a remote configuration repository.

22. The computer program product of claim 17, where the configuration element comprises a second variable for holding a value dependent on the software application.

23. The computer program product of claim 22, where the value of the second variable depends upon the computer system and the software application.

24. The computer program product of claim 22, where the second variable holds a uniform resource locator (URL) of a folder where the software application is to be installed.

* * * * *